Oct. 19, 1937.　　　　E. H. PIRON　　　2,096,005
CENTER PIN STRUCTURE
Filed April 17, 1933　　　2 Sheets-Sheet 1
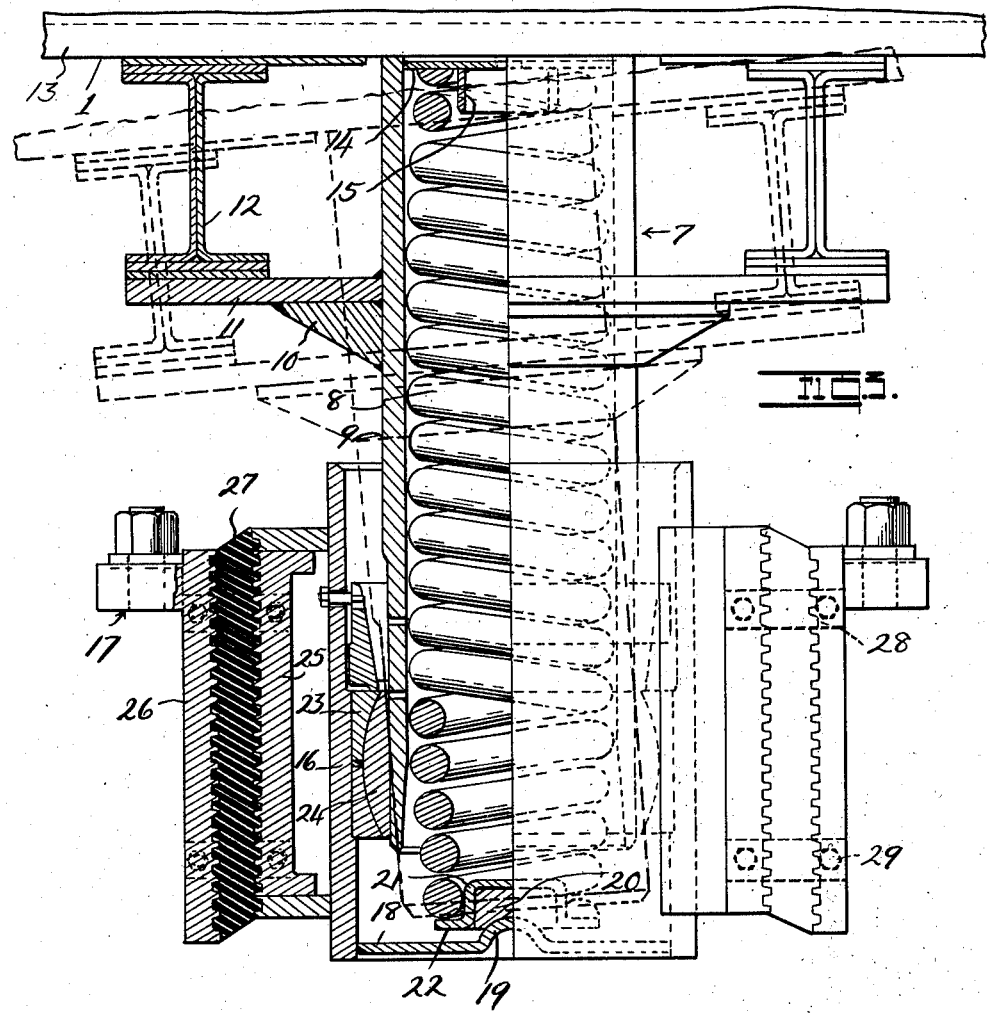
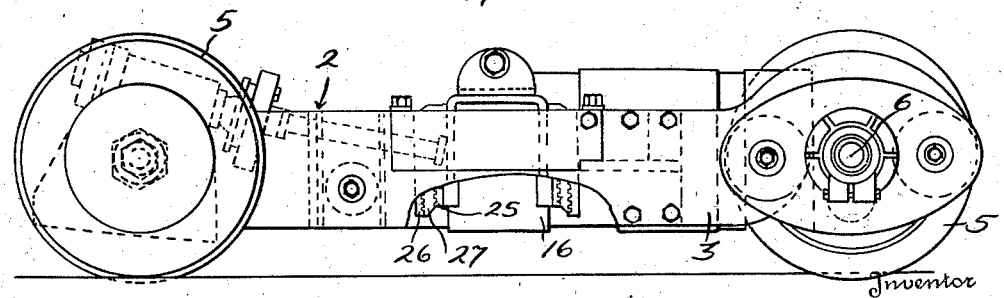
Inventor
Emil H. Piron

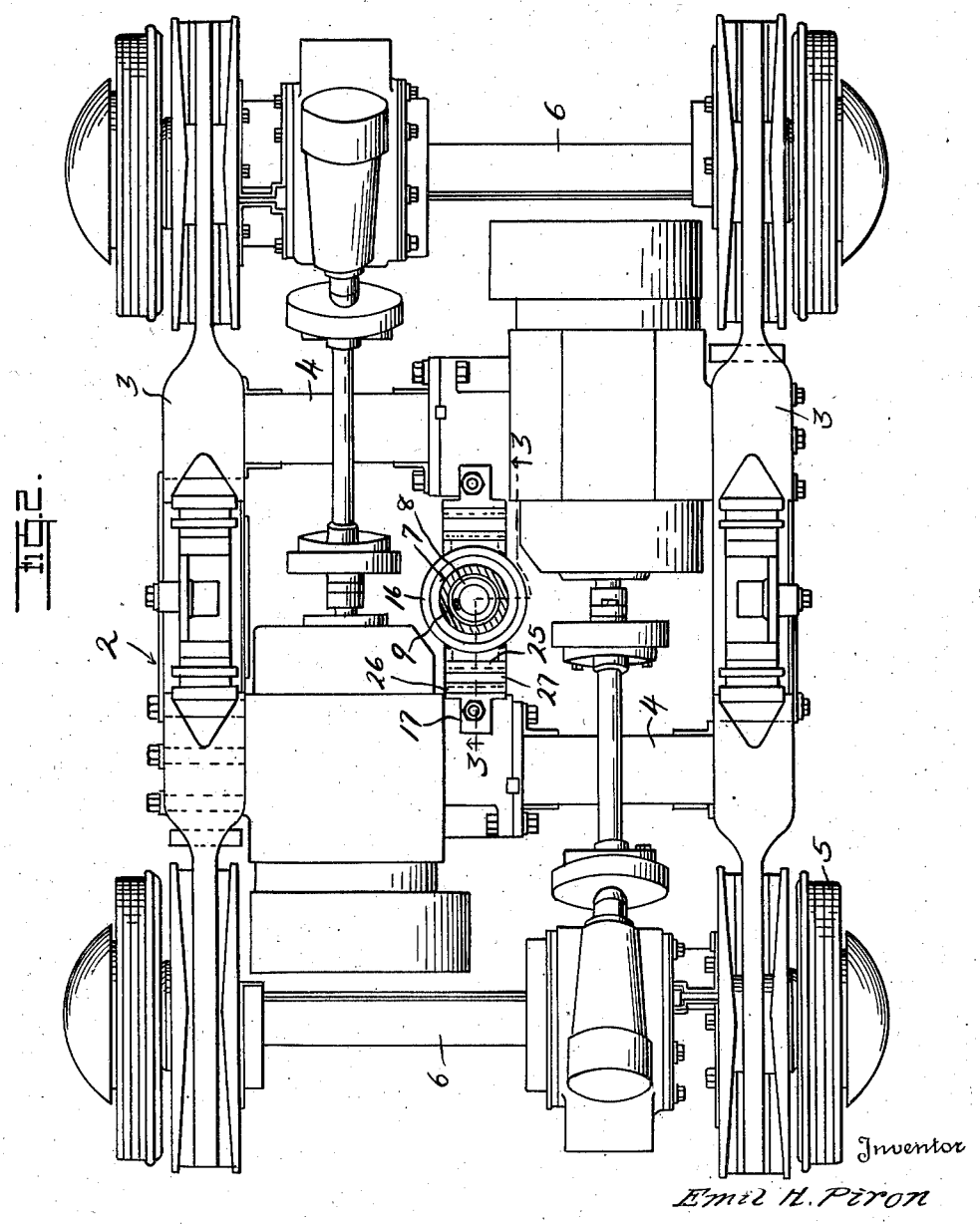

Patented Oct. 19, 1937

2,096,005

UNITED STATES PATENT OFFICE 2,096,005

CENTER PIN STRUCTURE

Emil H. Piron, Highland Park, Mich., assignor, by mesne assignments, to Transit Research Corporation, New York, N. Y., a corporation of New York Application April 17, 1933, Serial No. 666,606

29 Claims. (Cl. 105—199)

This invention relates to center pin structures for rail vehicles and is a continuation in part of and an improvement on the invention shown and described in my copending application Serial No. 664,248, filed April 3, 1933.

It is an object of the present invention to provide an improved mounting for the center spring and center pin base. Regardless of the rigidity with which a truck frame is constructed, there is always a certain amount of weaving thereof. As a result, the cross beams between which the center pin is mounted have an unavoidable relative motion which tends to break the hinge members from which the center pin base is pivotally supported. It is therefore an object of the present invention to provide resilient hinge means for the base capable of yielding to some extent in any direction and to a substantial extent in the direction of roll, thereby maintaining the desired features of the construction revealed in the above mentioned application, while overcoming a possible drawback thereof.

When a rail vehicle is in motion the individual trucks assume an angularity with respect to the track. As the wheel flanges contact the rails there is an impact which causes the wheels and the truck to assume a new direction. The car body tends to maintain the original direction, so that if there were no lateral cushioning there would be severe stresses at all points of support and the car body would be severely jolted. Such cushioning, in conventional practice, is provided by a truck bolster suspended by swing links, the bolster supporting the body springs. However, a truck bolster may not always be possible or desirable, as for instance where side springs and a center spring individually assume a portion of the static loading of the car body. It is therefore an object of this invention to provide a center pin structure including a resilient support therefor adapted to cushion transverse impulses of the truck which would otherwise be transmitted directly to the car body through the center pin structure.

In the construction of a rail vehicle, it is customary and advisable to provide for relative motion between the axles and the frame and between the parts of the driving connection between the frame and the car body. In conventional practice, these relative motions are provided for by lost motion clearances which result in undue wear, local fatigues and sound emission at the points of impact, in addition to setting up oscillations throughout the truck and car body. It is therefore an object of the present invention to provide a center pin construction including a driving member and a cushioning means adapted to yieldingly resist relative motion of a car body and its truck upon a change in the direction of the velocity relation therebetween.

More specifically, it is an object of the present invention to provide a center pin construction as revealed in the aforementioned copending application and to employ rubber cushioning elements as the supporting means therefor, the rubber supporting the center pin, and hence the car body, in shear, resisting rolling of the car body in shear and resisting relative horizontal motion between the truck and the car body in a fore and aft direction in compression.

Other objects and advantages, either directly ascribed or indirectly accruing from the favorable relation of parts, will become hereinafter more fully apparent as reference is had to the accompanying drawings, wherein my invention is illustrated by way of example and not in a limiting sense, and in which Figure 1 is a side elevation, partly broken away, of a rail vehicle showing an embodiment of my invention;

Figure 2 is a plan view of the truck of the vehicle;

Figure 3 is an enlarged cross section on the line 3—3 of Figure 1.

The rail vehicle illustrated in the present example is a street car having the car body 1, which is mounted upon trucks, but one truck 2 being shown. The frame of the truck comprises the side girders 3 and the cross beams 4 secured to the side girders and preferably welded thereto. The wheels 5 for engaging the rails are mounted upon the axles 6, which are journaled at the ends of the side girders.

For partly supporting the car body, I have provided the center pin structure 7 which comprises the upright coil spring 8 forming the resilient load carrying member and the upright rigid or stiff center pin or king pin 9. The center pin is cylindrical and extends substantially the length of the coil spring and houses the major portion thereof. The center pin extends through the bolster plates 10 and 11 and is preferably integrally secured thereto as by welding, these plates in turn being preferably welded together. The upper plate 11 supports the cross beams or body bolsters 12 of the car body and these cross beams or body bolsters support the floor 13 of the car body, this floor being located preferably immediately above the upper end of the center pin. This upper end is closed by the plate 14, which is preferably welded thereto and the upper convolution of the coil spring 8 engages this plate and is guided by the cylindrical pilot 15 secured to and depending from this plate. The construction is such that the center pin guides the coil spring, but allows relative movement of its convolutions.

The center pin structure also comprises the supporting base 16 in the nature of a rigid or a stiff cylindrical member and the diametrically opposite devices 17 carrying the base. The base encircles and houses the lower portions of the coil spring 8 and the center pin 9 and is of greater diameter than the center pin to provide clearance for limited angular movement thereof relative to the base. The base has its lower end closed by the plate 18 which is secured thereto preferably by welding and which is provided with the central or axial upwardly extending rounded or substantially hemi-spherical boss 19. 20 is a bearing having an arcuate lower face for fitting the upper face of the base, this bearing being located within the cup-shaped supporting washer 21 having the annular flange 22 which is engaged by the lower convolution of the coil spring 8. The washer serves to laterally position the lower convolution and the washer and bearing are universally supported upon the base. The base has fixedly secured therewithin the horizontally split outer bearing member 23 in which is snared in universal assembly the inner bearing member 24 having an inner cylindrical face in sliding contact with the cylindrical outer surface of the center pin 9.

The center pin base 16 extends downwardly between the cross beams 4 of the truck as far as possible, while maintaining a desired road clearance. Preferably, the base extends downwardly through the plane containing the axes of the truck wheels 5, as shown more particularly in Figure 1, and the universally mounted guide member 24 in which the center pin 9 slides is at or below the level of the plane containing the wheel axes, as also shown in this figure. It will thus be seen that the suspension and swivel means for the car body is capable of articulated movement in every direction and adapted to propel the car body from a point well below the floor thereof and also as close to the road bed as practical, whereby all the wheels of the truck will carry substantially equal loading at all times. At the same time, the car body is resiliently supported upon the base and lost motion clearances are eliminated, thereby eliminating noise and avoiding localized fatigues and severe stresses generally. Furthermore, the construction as thus far described is such that the center pin is capable of universal movement relative to its support, but this particular movement is definitely limited by the support, as indicated in dotted lines in Figure 3, illustrating maximum angularity of the various parts with respect to the base.

The structure as thus far described is that substantially shown and described in my copending application Serial Number 664,248, filed April 3, 1933.

The devices 17 of the center pin structure carry the center pin base upon the truck in a manner to yieldingly resist relative motion of the car body and the truck. These devices are alike and each is received between the base and an adjacent cross beam of the truck, and comprises the inner and outer plate members 25 and 26 respectively, and the rubber cushioning element 27 between these plate members. The plate members extend vertically and also transversely of the truck and the inner plate member is fixedly secured to the center pin base 16 and the outer plate member is mounted upon and detachably fixedly secured to the adjacent cross beam 4 of the truck. The cushioning element is maintained under continuous compression between the plate members in a direction normal to the direction of the static loading imposed by the car body through the center pin base and this compression is of sufficient magnitude to set up a frictional locking engagement of the cushioning element with the plate members capable of obviating slippage of the cushioning element and plate members during operation.

With this arrangement, the two devices form resilient connecting means between the center pin base and the truck capable of yielding to some extent in any direction and to a substantial extent in the direction of roll of the center pin base and the car body. Also, the cushioning elements of the two devices support the center pin and car body in shear, resist transverse rolling movement of the car body relative to the truck in shear, resist all horizontal impulses transmitted laterally of the truck in shear and resist relative motion of the car body and truck in a fore and aft direction in compression.

For the purpose of holding each of the devices 17 in assembled relation while the center pin structure is detached from the truck, I have provided the tie plates 28 which are detachably secured to the ends of the plate members 26 and 27 by suitable means, such as the cap bolts 29. These tie plates through the plate members exert sufficient compression upon the rubber cushioning elements to hold the same from slippage relative to the plate members and after the center pin structure has been assembled with the truck and the plate members have been fixedly secured to the cross beams of the truck, the tie plates are removed and the rubber cushioning elements are then held by the cross beams under compression of sufficient magnitude to obviate slippage of the cushioning elements relative to the plate members in engagement therewith.

What I claim as my invention is:

1. A center pin structure for rail vehicles, comprising means for providing a limited universal movement between a truck and a car body, and means for providing a substantial transverse rolling movement and limited cushioned fore and aft movement between the truck and car body.

2. A center pin structure for rail vehicles, comprising shear means for providing substantial transverse rolling movement, said shear means also comprising yieldable means for resisting a limited fore and aft movement between a truck and a car body.

3. A center pin structure for rail vehicles, comprising a center pin, a center pin base, connecting means for attachment of said base to a truck, and means associated with said connecting means for cushioning horizontal impulses transmitted laterally of said truck to said base, said last named means also yieldingly resisting the rocking of said base on said truck.

4. A center pin structure for rail vehicles, comprising a center pin, a center pin base, connecting means for attachment of said base to a truck providing substantial rolling movement, and resilient means associated with said connecting means providing cushioned fore and aft movement between a car body and a truck.

5. A center pin structure for rail vehicles, comprising a center pin, a center pin base yieldably supporting said center pin, and means for supporting said base on a truck, said means comprising resilient cushioning elements arranged to cushion horizontal movement between a truck and a car body in any direction.

6. A center pin structure for rail vehicles, comprising a center spring, a center spring base, and rubber cushioning elements for supporting said base on a vehicle truck.

7. A center pin structure for rail vehicles, comprising a center pin, a center pin base yieldably supporting said center pin, and rubber cushioning elements for supporting said base on a vehicle truck, said rubber being arranged to receive the vertical loading of said base in shear.

8. A center pin structure for rail vehicles, comprising a center pin, a center pin supporting base, and rubber cushioning elements for supporting said base on a vehicle truck, said rubber being arranged to resist the vertical and rolling motion of said base and a vehicle body wholly in shear and to resist fore and aft motion between the truck and the body in compression.

9. A center pin structure for rail vehicles, comprising a center base, a center spring for supporting a car body from said base, said spring being guided for limited universal movement with respect to said base, and resilient connecting means for attaching said base to a vehicle truck, said connecting means yieldingly resisting substantial rolling motion of said car body and said truck.

10. A center pin structure for rail vehicles, comprising a center pin base, a universally mounted center spring for supporting a car body from said base, a rigid driving member for attachment to said car body, a universal guide for said driving member associated with said base, and resilient means for supporting said universal guide upon a truck, said means in addition acting between said truck and said body to cushion longitudinal forces.

11. A center pin structure for rail vehicles, comprising a center base, a universally mounted resilient center spring for supporting a car body from said base, a housing surrounding said center spring for attachment to a car body to constitute a driving member, a universal guide in said base having vertical sliding connection with said driving member, and rubber elements for supporting said base from a truck, said rubber elements receiving the vertical, transverse and rolling motions of said base and car body in shear, said elements resisting relative fore and aft movement of said truck and said car body in compression.

12. In combination in a rail vehicle, a car body, a truck and rubber cushioning elements supporting said body from said truck, said rubber resisting the vertical and rolling movement of said body in shear, said rubber being under continuous compression in a direction normal to the direction of shear.

13. In combination in a rail vehicle, a truck, a car body and rubber cushioning elements supporting said body from said truck, said rubber resisting the vertical and rolling movement of said body in shear, said rubber being maintained under a compression normal to the direction of shear of sufficient magnitude to set up a frictional locking engagement with adjacent body and truck elements capable of obviating relative slippage during operation.

14. In combination in a rail vehicle, a truck, a car body, a center pin structure between said truck and said body and rubber cushioning elements supporting said center pin structure and resisting rolling and vertical movement thereof in shear, said rubber being maintained under continuous compression normal to the direction of shear.

15. In combination in a rail vehicle, a truck having side girders and cross beams, a car body, a center pin structure supporting and driving said body from said truck, said center pin structure including plate members for residence between said cross beams, and rubber cushioning elements between said plate members and said cross beams supporting said center pin structure in shear.

16. In combination in a rail vehicle, a truck having side girders and cross beams, a car body, a center pin structure supporting and driving said body from said truck, said center pin structure including plate members for residence between said cross beams, and rubber cushioning elements between said plate members and said cross beams supporting said center pin structure in shear, said rubber being maintained under sufficient compression by said beams and said plates to preclude slippage with respect thereto during operation.

17. A center pin structure for rail vehicles, comprising a center pin, a circular bearing member with which said center pin is in swivelling engagement and means between said base and a vehicle truck for providing substantial transverse rolling movement and limited cushioned fore and aft movement between said base and the truck.

18. A center pin structure for rail vehicles, comprising a center pin base, means for providing a limited universal movement between a car body and said base, and means between said base and a vehicle truck for providing transverse rolling movement and fore and aft movement between said base and the truck.

19. A center pin structure for rail vehicles, comprising a center pin base, and means between said base and a vehicle truck for providing susbtantial transverse rolling movement and limited cushioned fore and aft movement between said base and the truck, said means resisting the rolling movement in shear and the fore and aft movement in compression.

20. A center pin structure for rail vehicles comprising a center pin and center pin base assembly in frictional engagement, and means associated with said center pin and said assembly for providing susbtantial transverse rolling movement and a limited cushioned fore and aft movement between a truck and a car body.

21. A center pin construction comprising a center pin member, a center bearing member in freely swivelling frictional engagement therewith and capable of relative vertical movement with respect thereto during normal operation, and an elastic medium associated therewith for resisting relative fore and aft movement between a car body and a truck.

22. A center pin construction comprising a center pin member and a center bearing member in freely swivelling frictional engagement therewith and capable of relative vertical movement with respect thereto during normal operation, and rubber in direct engagement with one of said members for resisting relative fore and aft movements between a truck and car body in compression.

23. A center pin construction comprising a hollow center pin member, a center bearing member in vertically slidable engagement therewith and having a cup shaped bottom portion comprising a reservoir for lubricant, and an elastic medium associated with said center bearing member for resisting relative fore and aft movements between a truck and car body.

24. In combination in a rail vehicle, a truck, a car body in free swivelling engagement with said truck and being capable of transverse movement with respect to said truck, and elastic cushioning means adjacent the point of such engagement for resisting said transverse movements in shear.

25. In combination in a rail vehicle, a truck, a car body in free swivelling engagement with said truck and capable of transverse movements with respect thereto, an elastic shear means secured to said truck adjacent the point of such engagement, and means acting in response to the motions of said body for imposing shear on said elastic means during relative transverse movements of said body and said truck.

26. In combination in a rail vehicle, a truck, a car body in free swivelling engagement with said truck and capable of rolling movement with respect thereto, and anti-friction means for opposing such relative rolling movements comprising an elastic shear medium with its shear surfaces arranged to resist horizontal thrusts.

27. In combination in a rail truck, a center pin and a center pin bearing member in freely swivelling engagement therewith and capable of universal movement with respect thereto, said bearing member in turn being also capable of universal movement with respect to the remainder of the truck.

28. In combination in a rail truck, a center pin, a center bearing member in freely swivelling engagement therewith, said bearing member being capable of lateral motions with respect to the remainder of the truck, an elastic shear medium fore of the axis of said center pin and an elastic shear medium aft of the axis of said center pin for opposing such lateral motions of said center bearing member.

29. In combination in a rail truck, a center pin, a center bearing member in freely swivelling relation with said center pin, and normally coaxial therewith said center pin and bearing member being also capable of assuming non-coaxial positions during normal operation, and an elastic medium for opposing all horizontal movements of said center pin with respect to the truck.

EMIL H. PIRON.